United States Patent
Brennen et al.

(10) Patent No.: US 10,773,817 B1
(45) Date of Patent: Sep. 15, 2020

(54) BI-DIRECTIONAL FLOW RAM AIR SYSTEM FOR AN AIRCRAFT

(71) Applicants: Peter A. Brennen, Los Angeles, CA (US); Chris K. Lee, Monterey Park, CA (US); Peter Schmidt, Long Beach, CA (US)

(72) Inventors: Peter A. Brennen, Los Angeles, CA (US); Chris K. Lee, Monterey Park, CA (US); Peter Schmidt, Long Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 359 days.

(21) Appl. No.: 15/915,996

(22) Filed: Mar. 8, 2018

(51) Int. Cl.
*B64D 33/02* (2006.01)
*B64D 13/08* (2006.01)
*B64D 13/06* (2006.01)

(52) U.S. Cl.
CPC ............ *B64D 33/02* (2013.01); *B64D 13/08* (2013.01); *B64D 2013/0614* (2013.01); *B64D 2013/0618* (2013.01); *B64D 2013/0659* (2013.01)

(58) Field of Classification Search
CPC ............ B64D 13/08; B64D 2013/0618; B64D 2013/0659; B64D 2013/0614
USPC .......................................................... 244/58
See application file for complete search history.

(56) References Cited

U.S. PATENT DOCUMENTS

| | | | |
|---|---|---|---|
| 1,320,095 | A | 10/1919 | Robinson |
| 1,350,230 | A | 8/1920 | McCain, Jr. |
| 1,377,827 | A | 5/1921 | Ignaci |
| 1,708,799 | A | 4/1929 | Norwood |
| 1,924,657 | A | 8/1933 | Saine et al. |
| 2,091,677 | A | 8/1937 | Fredericks |
| 2,313,934 | A | 3/1943 | Gienger |
| 2,482,391 | A | 9/1949 | Webster |
| 2,502,322 | A | 3/1950 | Iredell, Jr. |

(Continued)

FOREIGN PATENT DOCUMENTS

| | | |
|---|---|---|
| DE | 19854335 A1 | 6/2000 |
| DE | 102011117542 A1 | 5/2013 |

(Continued)

OTHER PUBLICATIONS

Non Final Office Action for U.S. Appl. No. 15/855,725 dated Oct. 31, 2019.

(Continued)

*Primary Examiner* — Claude J Brown
(74) *Attorney, Agent, or Firm* — Tarolli, Sundheim, Covell & Tummino LLP (57) ABSTRACT

A ram air system for an aircraft having an engine and a fuselage with an outer mold line. The ram air system includes an engine air pathway having an opening in the outer mold line defining an engine inlet. The engine air pathway is configured to supply operating air for combustion in the engine. An auxiliary air pathway includes a first intake disposed inside the outer mold line in the engine inlet and a second intake disposed externally to the engine air pathway. The auxiliary air pathway is configured to draw in cooling air to cool ancillary aircraft components from at least one of the first intake and the second intake based on the airspeed of the aircraft.

18 Claims, 6 Drawing Sheets

(56) References Cited

U.S. PATENT DOCUMENTS

| | | | |
|---|---|---|---|
| 2,555,347 A | 6/1951 | Lee | |
| 2,571,281 A | 10/1951 | Neher | |
| 2,721,456 A * | 10/1955 | Whitney, Jr. | B64D 13/06 62/402 |
| 2,948,317 A | 8/1960 | Munro | |
| 3,135,462 A | 6/1964 | Ghard | |
| 3,142,088 A | 7/1964 | Cravath | |
| 3,173,295 A | 3/1965 | Magleby | |
| 3,179,143 A | 4/1965 | Schultz et al. | |
| 3,188,041 A | 6/1965 | Town | |
| 3,194,513 A * | 7/1965 | Hooper | B64C 29/0066 244/23 R |
| 3,289,521 A | 12/1966 | Sloun | |
| 3,635,589 A | 1/1972 | Kristiansen | |
| 3,645,749 A | 2/1972 | Paunovic | |
| 3,656,391 A | 4/1972 | Arx | |
| 3,673,860 A | 7/1972 | Flaherty et al. | |
| 3,680,429 A | 8/1972 | Briles | |
| 3,685,391 A | 8/1972 | Gapp et al. | |
| 3,695,780 A | 10/1972 | Velkoff | |
| 3,796,398 A | 3/1974 | Eilertson | |
| 3,811,791 A | 5/1974 | Cotton | |
| 3,848,389 A | 11/1974 | Gapp et al. | |
| 3,854,030 A | 12/1974 | Roye | |
| 4,015,456 A | 4/1977 | Moberg | |
| 4,072,049 A | 2/1978 | Miller | |
| 4,209,177 A | 6/1980 | Hall | |
| 4,240,290 A | 12/1980 | Bellman et al. | |
| 4,252,339 A | 2/1981 | Shimizu et al. | |
| 4,261,534 A | 4/1981 | Roselli | |
| 4,414,851 A | 11/1983 | Maglic | |
| 4,439,968 A | 4/1984 | Dunn | |
| 4,493,195 A * | 1/1985 | Zalesak | B64D 13/06 62/121 |
| 4,515,499 A | 5/1985 | Furiate | |
| 4,691,973 A | 9/1987 | Rosheim | |
| 4,708,040 A | 11/1987 | Erickson | |
| 4,713,823 A * | 12/1987 | Smith | H01S 3/0953 372/58 |
| 4,836,748 A | 6/1989 | Church | |
| 4,923,164 A | 5/1990 | Stenberg | |
| 4,975,006 A | 12/1990 | Swanson | |
| 4,987,714 A | 1/1991 | Lemke | |
| 5,086,622 A * | 2/1992 | Warner | B64D 13/06 62/88 |
| 5,096,382 A | 3/1992 | Gratzer | |
| 5,114,096 A | 5/1992 | Wernicke | |
| 5,203,164 A | 4/1993 | Paulson | |
| 5,222,699 A | 6/1993 | Albach | |
| 5,275,531 A | 1/1994 | Roberts | |
| 5,289,994 A | 3/1994 | Del Campo Aguilera | |
| 5,335,886 A | 8/1994 | Greenhalgh | |
| 5,415,066 A | 5/1995 | Erickson et al. | |
| 5,452,631 A | 9/1995 | Erickson | |
| 5,672,036 A | 9/1997 | Medal | |
| 5,673,875 A | 10/1997 | Martin et al. | |
| 5,697,740 A | 12/1997 | Von Haas et al. | |
| 5,765,783 A | 6/1998 | Albion | |
| 5,794,893 A | 8/1998 | Diller et al. | |
| 5,803,406 A | 9/1998 | Kolodziej et al. | |
| 5,810,288 A | 9/1998 | Sager | |
| 5,870,935 A | 2/1999 | Erickson et al. | |
| 5,918,870 A | 7/1999 | Stark | |
| 5,927,651 A | 7/1999 | Geders et al. | |
| 5,931,422 A | 8/1999 | Geiger et al. | |
| 5,958,809 A | 9/1999 | Fujiwara et al. | |
| 6,027,074 A | 2/2000 | Cameron et al. | |
| 6,048,581 A | 4/2000 | Waldrop, III | |
| 6,068,219 A | 5/2000 | Arata | |
| 6,076,766 A | 6/2000 | Gruensfelder | |
| 6,129,324 A | 10/2000 | Blanchard | |
| 6,141,928 A | 11/2000 | Platt | |
| 6,145,791 A | 11/2000 | Diller et al. | |
| 6,146,075 A | 11/2000 | Delangis | |
| 6,164,595 A | 12/2000 | Williams | |
| 6,189,324 B1 * | 2/2001 | Williams | B64D 13/06 62/172 |
| 6,193,187 B1 | 2/2001 | Scott et al. | |
| 6,209,824 B1 | 4/2001 | Caton et al. | |
| 6,282,260 B1 | 8/2001 | Grodzins | |
| 6,337,294 B1 | 1/2002 | Waldrop, III | |
| 6,349,903 B2 | 2/2002 | Caton et al. | |
| 6,354,636 B2 | 3/2002 | Matsuzawa et al. | |
| 6,364,251 B1 | 4/2002 | Yim | |
| 6,375,122 B1 | 4/2002 | Cameron et al. | |
| 6,398,160 B1 | 6/2002 | Hsia | |
| 6,467,733 B1 | 10/2002 | Young et al. | |
| 6,575,407 B2 | 6/2003 | McCallum et al. | |
| 6,588,709 B1 | 7/2003 | Dunne et al. | |
| 6,599,085 B2 | 7/2003 | Nadeau et al. | |
| 6,607,162 B2 | 8/2003 | Warsop et al. | |
| 6,702,535 B1 | 3/2004 | Stevenson et al. | |
| 6,808,144 B1 | 10/2004 | Nicolai et al. | |
| 6,827,312 B2 | 12/2004 | Riedell | |
| 6,877,690 B1 | 4/2005 | Bragg | |
| 7,007,889 B2 | 3/2006 | Charron | |
| 7,134,743 B2 | 11/2006 | Silverbrook | |
| 7,188,821 B2 | 3/2007 | Curtis | |
| 7,472,863 B2 | 1/2009 | Pak | |
| 7,484,925 B2 | 2/2009 | Carlson et al. | |
| 7,487,939 B1 | 2/2009 | Christof | |
| 7,533,506 B2 | 5/2009 | Platt | |
| 8,005,570 B2 | 8/2011 | Gloden et al. | |
| 8,056,862 B1 | 11/2011 | Tomerlin et al. | |
| 8,094,781 B1 | 1/2012 | Safai et al. | |
| 8,104,718 B2 | 1/2012 | Shaw | |
| 8,142,124 B2 | 3/2012 | Kulesha | |
| 8,220,804 B2 | 7/2012 | Erickson et al. | |
| 8,229,064 B2 | 7/2012 | Grodzins | |
| 8,267,612 B2 | 9/2012 | Yeh | |
| 8,601,918 B2 | 12/2013 | Erickson | |
| 8,636,439 B2 | 1/2014 | Jaouen | |
| 8,784,028 B2 | 7/2014 | Clark | |
| 8,814,100 B2 | 8/2014 | Geders | |
| 8,833,033 B2 | 9/2014 | Schaefer et al. | |
| 9,016,657 B2 | 4/2015 | Fang et al. | |
| 9,062,696 B2 | 6/2015 | Demerath et al. | |
| 9,151,343 B2 | 10/2015 | Norton | |
| 9,174,723 B2 | 11/2015 | Madsen | |
| 9,316,512 B2 | 4/2016 | Georgeson et al. | |
| 9,567,088 B2 | 2/2017 | Godlasky et al. | |
| 9,581,722 B2 | 2/2017 | Neal | |
| 9,631,998 B2 | 4/2017 | Sullivan et al. | |
| 9,643,712 B1 | 5/2017 | Luce | |
| 9,677,582 B2 | 6/2017 | Smith | |
| 9,724,979 B1 * | 8/2017 | Thumati | B64D 45/00 |
| 9,849,968 B2 | 12/2017 | Linch et al. | |
| 9,897,132 B2 | 2/2018 | Neal et al. | |
| 9,975,623 B2 | 5/2018 | Arata | |
| 10,054,958 B2 | 8/2018 | Creasman | |
| 10,106,243 B2 | 10/2018 | Keavney et al. | |
| 10,167,989 B2 | 1/2019 | Desrochers | |
| 10,287,013 B2 | 5/2019 | Starace et al. | |
| 10,481,616 B2 | 11/2019 | Creasman | |
| 10,612,580 B2 | 4/2020 | Neal et al. | |
| 2001/0006207 A1 | 7/2001 | Caton et al. | |
| 2002/0074452 A1 | 6/2002 | Ingram | |
| 2002/0130569 A1 | 9/2002 | Reynolds et al. | |
| 2002/0141871 A1 | 10/2002 | Medamaranahally | |
| 2003/0012653 A1 | 1/2003 | Diemunsch | |
| 2003/0044283 A1 | 3/2003 | Nadeau et al. | |
| 2003/0052319 A1 | 3/2003 | Chen et al. | |
| 2003/0132344 A1 * | 7/2003 | Johnson | B64D 13/00 244/118.5 |
| 2003/0192985 A1 | 10/2003 | Lipeles | |
| 2003/0209634 A1 | 11/2003 | Preston | |
| 2003/0218099 A1 | 11/2003 | Preston | |
| 2005/0224655 A1 | 10/2005 | Guittard et al. | |
| 2006/0011777 A1 | 1/2006 | Arlton et al. | |
| 2006/0257251 A1 | 11/2006 | Carlson et al. | |
| 2007/0023566 A1 | 2/2007 | Howard | |
| 2007/0034739 A1 | 2/2007 | Yoeli | |
| 2008/0049895 A1 | 2/2008 | Agnihotri et al. | |

(56) References Cited

U.S. PATENT DOCUMENTS

| | | |
|---|---|---|
| 2008/0260491 A1 | 10/2008 | Soeda et al. |
| 2008/0272226 A1 | 11/2008 | Colclough |
| 2009/0084896 A1* | 4/2009 | Boucher ............... B64D 13/08 244/118.5 |
| 2010/0185346 A1 | 7/2010 | Surmont |
| 2010/0256839 A1 | 10/2010 | Fitzpatrick |
| 2011/0036938 A1 | 2/2011 | Blomeley |
| 2011/0046817 A1 | 2/2011 | Hamke et al. |
| 2011/0052392 A1 | 3/2011 | Khmel |
| 2012/0091257 A1 | 4/2012 | Wolff et al. |
| 2012/0213636 A1 | 8/2012 | Gallant et al. |
| 2012/0248259 A1 | 10/2012 | Page et al. |
| 2012/0292436 A1 | 11/2012 | Karem |
| 2013/0170995 A1 | 7/2013 | Chen |
| 2013/0277503 A1 | 10/2013 | Geders |
| 2013/0333165 A1 | 12/2013 | Prest et al. |
| 2014/0184786 A1 | 7/2014 | Georgeson et al. |
| 2014/0231593 A1 | 8/2014 | Karem |
| 2014/0234053 A1 | 8/2014 | Martin |
| 2015/0016920 A1 | 1/2015 | Yamazaki |
| 2015/0102157 A1 | 4/2015 | Godlasky et al. |
| 2015/0107261 A1* | 4/2015 | Moes ..................... B64D 13/08 60/783 |
| 2015/0123470 A1 | 5/2015 | Moore et al. |
| 2015/0222027 A1 | 8/2015 | Dupuis |
| 2015/0284075 A1 | 10/2015 | Alber |
| 2016/0023527 A1 | 1/2016 | Dietrich |
| 2016/0152334 A1* | 6/2016 | Prisell .................... B64C 21/06 244/73 R |
| 2016/0222609 A1 | 8/2016 | Wolters |
| 2016/0252468 A1 | 9/2016 | Lou et al. |
| 2016/0271723 A1 | 9/2016 | Harada et al. |
| 2016/0312414 A1 | 10/2016 | Fowler et al. |
| 2016/0312417 A1 | 10/2016 | McCue et al. |
| 2017/0029091 A1 | 2/2017 | Linch et al. |
| 2017/0261149 A1 | 9/2017 | Desrochers |
| 2018/0051945 A1* | 2/2018 | Hanov .................... F28F 27/00 |
| 2018/0229849 A1* | 8/2018 | Behrens .................. F02C 6/08 |
| 2019/0084688 A1* | 3/2019 | Parsons ................... B64C 33/02 |
| 2019/0093814 A1 | 3/2019 | Desrochers |

FOREIGN PATENT DOCUMENTS

| | | |
|---|---|---|
| EP | 1741981 A1 | 1/2007 |
| EP | 1982914 A2 | 10/2008 |
| EP | 1988014 A2 | 11/2008 |
| EP | 2177966 A2 | 4/2010 |
| EP | 2481935 A1 | 8/2012 |
| EP | 2703703 A1 | 3/2014 |
| EP | 2796734 A1 | 10/2014 |
| FR | 745785 | 5/1933 |
| FR | 2871136 B1 | 9/2006 |
| FR | 2897039 A1 | 8/2007 |
| GB | 2058990 A | 4/1981 |
| GB | 2159447 A | 12/1985 |
| JP | S63299876 A | 12/1988 |
| JP | S63299877 A | 12/1988 |
| JP | 2003113828 A | 4/2003 |
| WO | 94/26589 A1 | 11/1994 |
| WO | 00/28221 A2 | 5/2000 |
| WO | 02/04174 A1 | 1/2002 |
| WO | 2006002464 A1 | 1/2006 |
| WO | 2013041025 A1 | 3/2013 |
| WO | 2014026993 A1 | 2/2014 |

OTHER PUBLICATIONS

Industry Publication entitled: "Southco 81-85-85 Information Guide", www.southco.com, pp. 269-274, 276; 272-285; 497.

Edwards, "Measurements of Skin-Friction Using Surface-Pitot Tubes in Free Flight at Supersonic Speeds", Aeronautical Research Council, C.P. No. 744 (1964).

Hopkins, et al., "Study of Suface Pitots for Measuring Turbulent Skin Friction at Supersonic Mach Numbers-Adiabatic Wall", NASA TN D-3478 (1966).

EAST: "Measurement of skin friction at low subsonic speeds by the razor-blade technique" HM Stationery Office, 1966.

GADD: "A Note on the Theory of the Stanton Tube"; HM Stationery Office, 1960.

Rechenbert, I. "Measurement of turbulent skin-friction with the preston tube": (1962).

Stanton, et al., "On the conditions at the boundary of a fluid in turbulent motion"; Proceedings of the Royal Society of London. Series A, Containing Papers of a Mathematical and Physical Character (1920): 413-434.

Guzman, et al., "A Non-Destructive Method to Classify the Correct Installation of Blind Bolts", SAE Int. J. Mater, Manf 7(1):2014, doi:10.4271/20136/01/2184; pp. 45-57.

Final Office Action for U.S. Appl. No. 16/198,036 dated Aug. 9, 2019.

* cited by examiner

# BI-DIRECTIONAL FLOW RAM AIR SYSTEM FOR AN AIRCRAFT

TECHNICAL FIELD

This disclosure relates to a ram air system for a vehicle and, more particularly, to a bi-directional flow ram air system for an aircraft.

BACKGROUND

Previous aircraft designs have been provided with multiple openings/apertures on the outer mold line of the aircraft fuselage in order to supply air to various aircraft systems. However, it is generally desirable to reduce the number of openings on the outer mold line of the aircraft fuselage. The provision of multiple openings in the outer mold line may result in an undesirable impact on aircraft design and performance. For example, multiple openings in the outer mold line may increase drag, increase vulnerability, and/or increase maintenance due to foreign objects/debris entering the openings.

The number of openings on the outer mold line required to provide air to the aircraft systems may be reduced by providing an air off-take within the engine inlet. However, it has been found that such an arrangement can result in undesirable aircraft operational characteristics. For example, when the aircraft is traveling below a certain airspeed (e.g., ground operation and low-mach flight) suction in the engine intake due to engine operation can prevent air from flowing into the off-take. In some instances, the suction can be great enough to suck air out of the off-take.

SUMMARY

In an example, a ram air system for an aircraft having an engine and a fuselage with an outer mold line is described. The ram air system includes an engine air pathway having an opening in the outer mold line defining an engine inlet. The engine air pathway is configured to supply operating air for combustion in the engine. An auxiliary air pathway includes a first intake disposed inside the outer mold line in the engine inlet and a second intake disposed externally to the engine air pathway. The auxiliary air pathway is configured to draw in cooling air to cool ancillary aircraft components from at least one of the first intake and the second intake based on the airspeed of the aircraft.

In an example, a method of operating a ram air system for an aircraft having an engine and an outer mold line is described. The method includes providing an engine air pathway having an engine inlet that supplies operating air for combustion in the engine and an auxiliary air pathway that supplies cooling air for cooling ancillary aircraft components. The auxiliary air pathway includes a first intake disposed inside the outer mold line in the engine inlet and a second intake disposed externally to the engine air pathway. The speed of the aircraft is determined. At least one of the first intake and the second intake is selected for drawing in the cooling air into the auxiliary air pathway based on the determined aircraft speed.

In an example, a ram air system for an aircraft having an engine and a fuselage with an outer mold line is described. The ram air system includes an engine air pathway having an opening in the outer mold line defining an engine inlet. The engine air pathway is configured to provide operating air for combustion in the engine. An auxiliary air pathway is configured to draw in cooling air to cool ancillary aircraft components from at least one of a first source and a second source based on the airspeed of the aircraft. The auxiliary air pathway includes a first intake as the first source. The first intake is disposed inside the outer mold line in the engine inlet. A first check valve is provided at the first intake opening. A second intake is the second source. The second intake is disposed externally to the engine air pathway. A plurality of branches provide cooling air to at least one of the ancillary aircraft components. Each of the plurality of branches includes a check valve and an air mover. The air mover is configured to move air through a respective branch to cool the at least one ancillary aircraft component. The check valve is in an open condition when the air mover is not in operation and a closed condition when the air mover is in operation.

BRIEF DESCRIPTION OF THE DRAWINGS

For a better understanding, reference may be made to the accompanying drawings, in which.

DESCRIPTION OF ASPECTS OF THE DISCLOSURE

The systems and methods of the present disclosure overcome problems that can be associated with providing an air off-take within the engine inlet by providing an arrangement that moves air in a desired direction through air flow branches that are in fluid communication with the off-take regardless of the airspeed of the aircraft. Specifically, an air flow system is provided in the air flow branches, which are fed by the engine inlet off-take. The air flow system in each of the air flow branches is configured to facilitate air flow through the branch in the desired direction even when the aircraft is in ground operation and/or during low-mach flight. A check valve is provided at the engine inlet off-take. The check valve can prevent air from undesirably being sucked out of the engine inlet off-take, thereby preventing air from flowing through the branches in a direction opposite to the desired direction. Additionally, a bi-directional air flow pathway is provided in a bay of the aircraft. The bi-directional air flow pathway further provides air to the air flow branches such that air flow in the desired direction can be maintained. A plurality of air flow branches can be fed from the engine inlet off-take.

Figure 1:
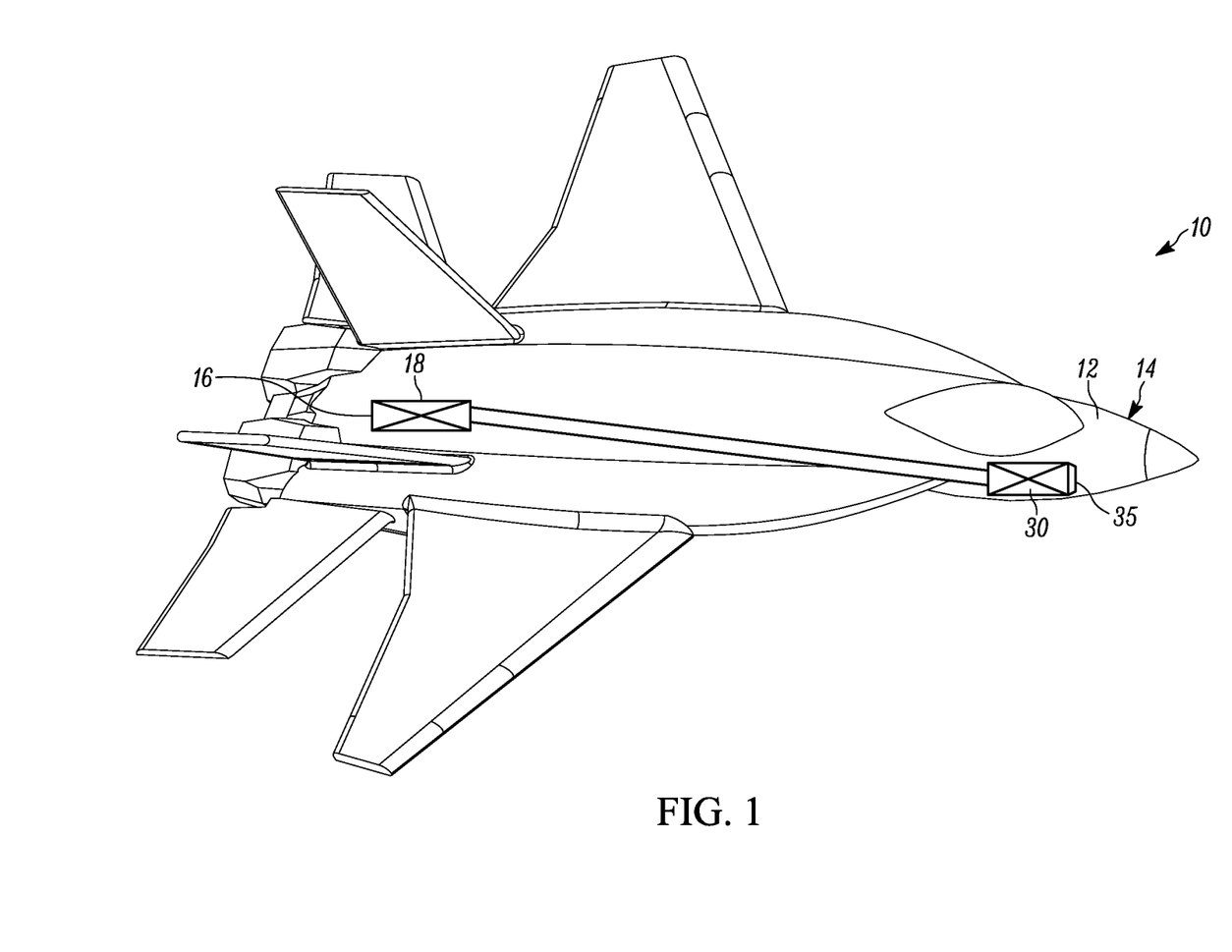
FIG. 1 is an example illustration of an aircraft equipped with a bi-directional flow ram air system.

FIG. 1 depicts an aircraft 10 provided with a bi-directional flow ram air system 30. The aircraft 10 includes a fuselage 12 and an outer mold line 14. The aircraft 10 is propelled by an engine 16 that is disposed in an engine bay 18 provided in the fuselage 12. The ram air system 30 includes an intake opening 35 provided on the outer mold line 14. The intake opening 35 defines an engine inlet 40. The engine inlet 40 supplies combustion air for combustion in the engine via an engine air pathway 45. During engine 16 operation, the combustion air flows into the fuselage 12 via the intake opening 35, flows through the engine air pathway 45, and is combusted in the engine 16. The exhaust gases produced as a result of the combustion process are exhausted from the aircraft via an engine exhaust opening 20 that is provided on the outer mold line 14.

Figure 2:
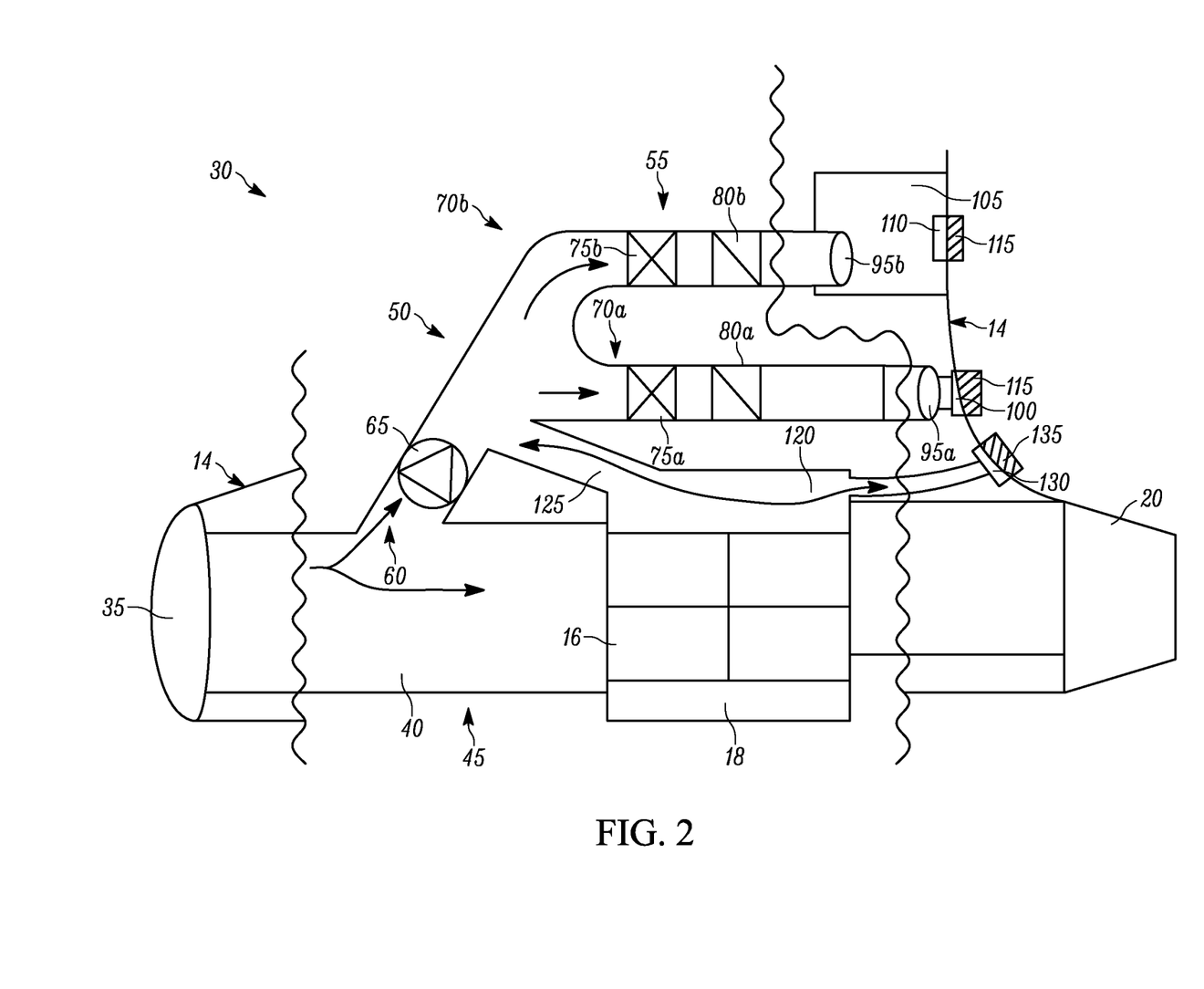
FIG. 2 is an example schematic representation of the bi-directional flow ram air system of FIG. 1.

The ram air system 30 further includes an ancillary air system 50, depicted schematically in FIG. 2. The ancillary air system 50 is also depicted in block diagram form in FIGS. 3-5. The ancillary air system 50 includes an auxiliary air pathway 55. In the ram air system 30 depicted in FIGS. 2-5, the auxiliary air pathway 55 is configured as a cooling air pathway (i.e., arranged to provide air to cool aircraft components). However, it is contemplated that the auxiliary air pathway 55 may be configured to provide air for other aircraft needs. The cooling air pathway 55 (i.e., the auxiliary air pathway) is in fluid communication with the engine air pathway 45 via an engine inlet off-take 60. The engine inlet off-take 60 effectively acts as a first intake for the cooling air pathway 55. In the ram air system 30 depicted in FIGS. 2-5, the cooling air pathway 55 is in fluid communication with the engine air pathway 45 via a single engine inlet off-take 60. However, it is contemplated that multiple cooling off-takes could be provided.

In one example, a primary check valve 65 is provided at the junction between the cooling air pathway 55 and the engine air pathway 45. The primary check valve 65 is configured to control air flow between the engine air pathway 45 and the cooling air pathway 55. In particular, the primary check valve 65 is configured to facilitate air flow from the engine air pathway 45 into the cooling air pathway 55 and substantially prevent air flow from the cooling air pathway 55 into the engine air pathway 45. It is contemplated that the single, primary check valve 65 may be replaced with a plurality of check valves that are configured to control air flow through different branches of the cooling air pathway 55. For example, rather than the single primary check valve 65 controlling air flow through all of the branches of the cooling air pathway 55, a check valve may be provided in each branch of the cooling air pathway 55 to control air flow through that respective branch.

The cooling air pathway 55 includes a plurality of cooling branches 70a, 70b. In the ram air system depicted in FIGS. 2-5, two cooling branches 70a, 70b are provided. However, it is contemplated that a fewer or greater number of cooling branches may be provided. Each cooling branch 70a, 70b includes a respective heat exchanging arrangement 75a, 75b and a respective air flow system 80a, 80b. The heat exchanging arrangement 75a, 75b can be a physical heat exchanger that provides cooling to ancillary aircraft components. The ancillary aircraft components can be an environmental control system, a fuel system, the engine and associated systems, any aircraft electronics, or other aircraft components to which it is desired to provided cooling. The heat exchanging arrangement 75a, 75b can also, or instead, supply cooling air directly onto the ancillary aircraft components or into a bay that houses the ancillary aircraft components. It is contemplated that the heat exchanging arrangement 75a, 75b may be any other arrangement that cools ancillary components (directly or indirectly) or provides cooling air/air flow to a desired area of the aircraft 10.

Figure 3:
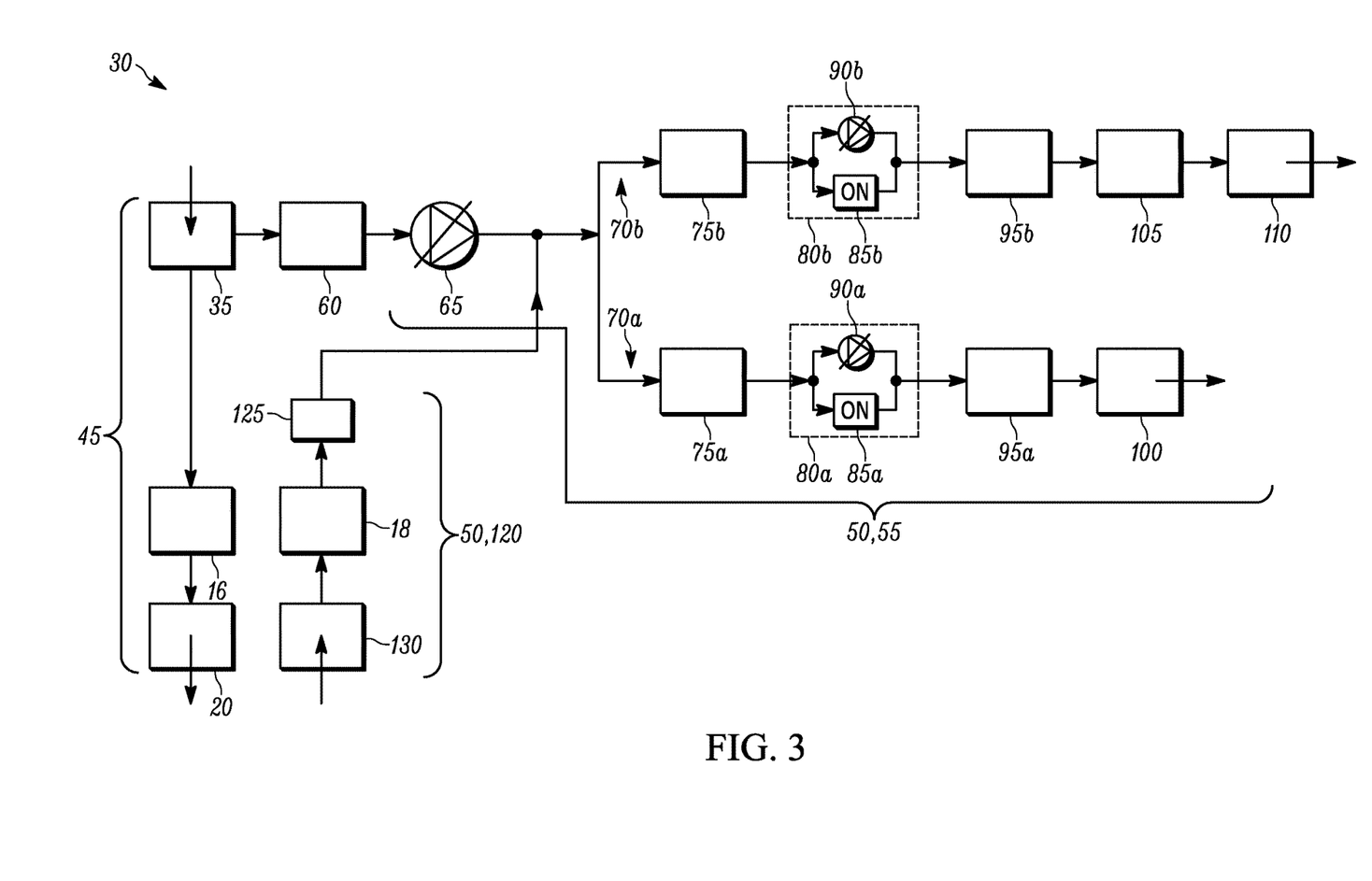
FIG. 3 is an example box diagram representation of the bi-directional flow ram air system of FIG. 1 in a first operating profile.
Figure 4:
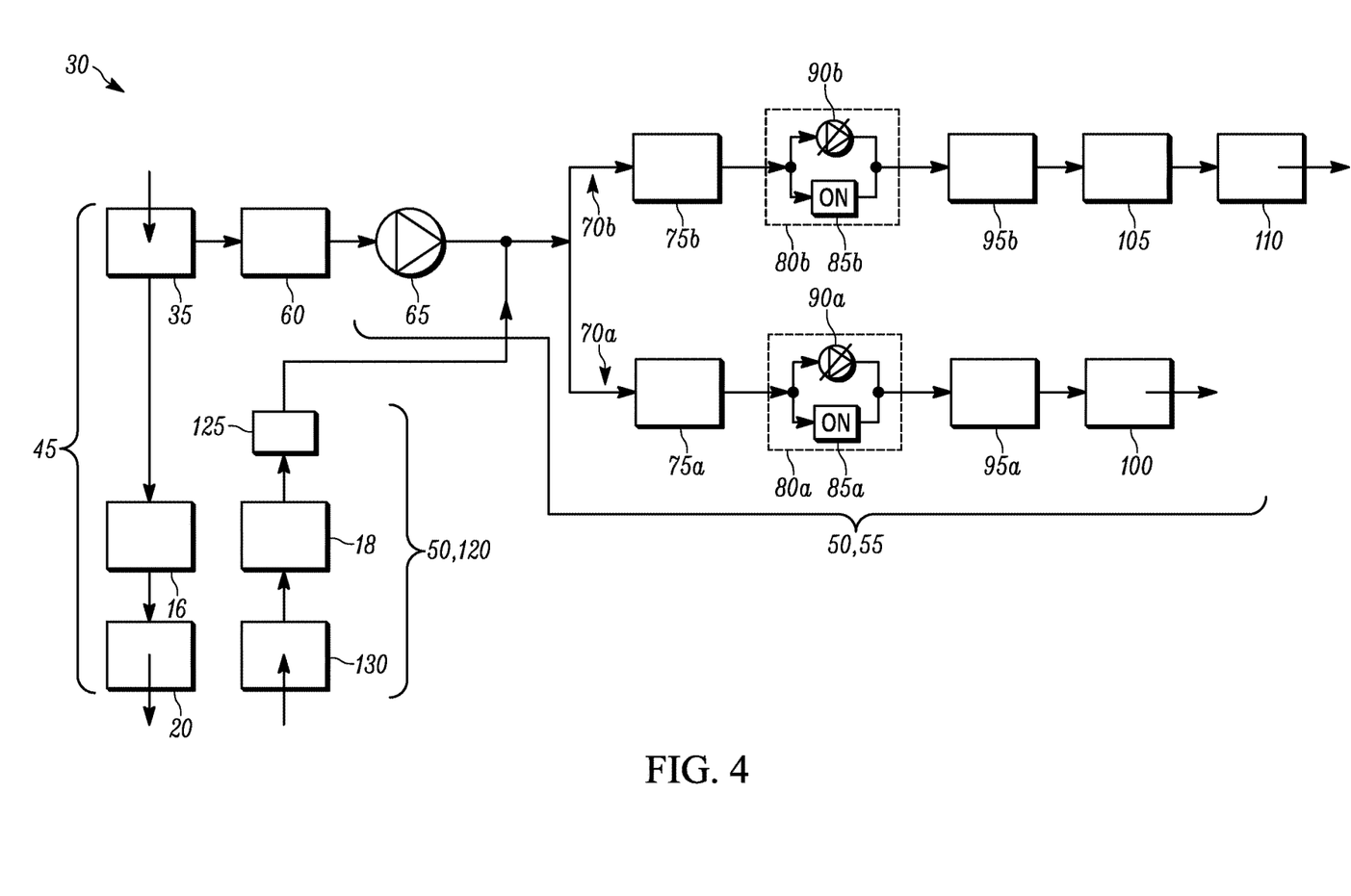
FIG. 4 is an example box diagram representation of the bi-directional flow ram air system of FIG. 1 in a second operating profile.
Figure 5:
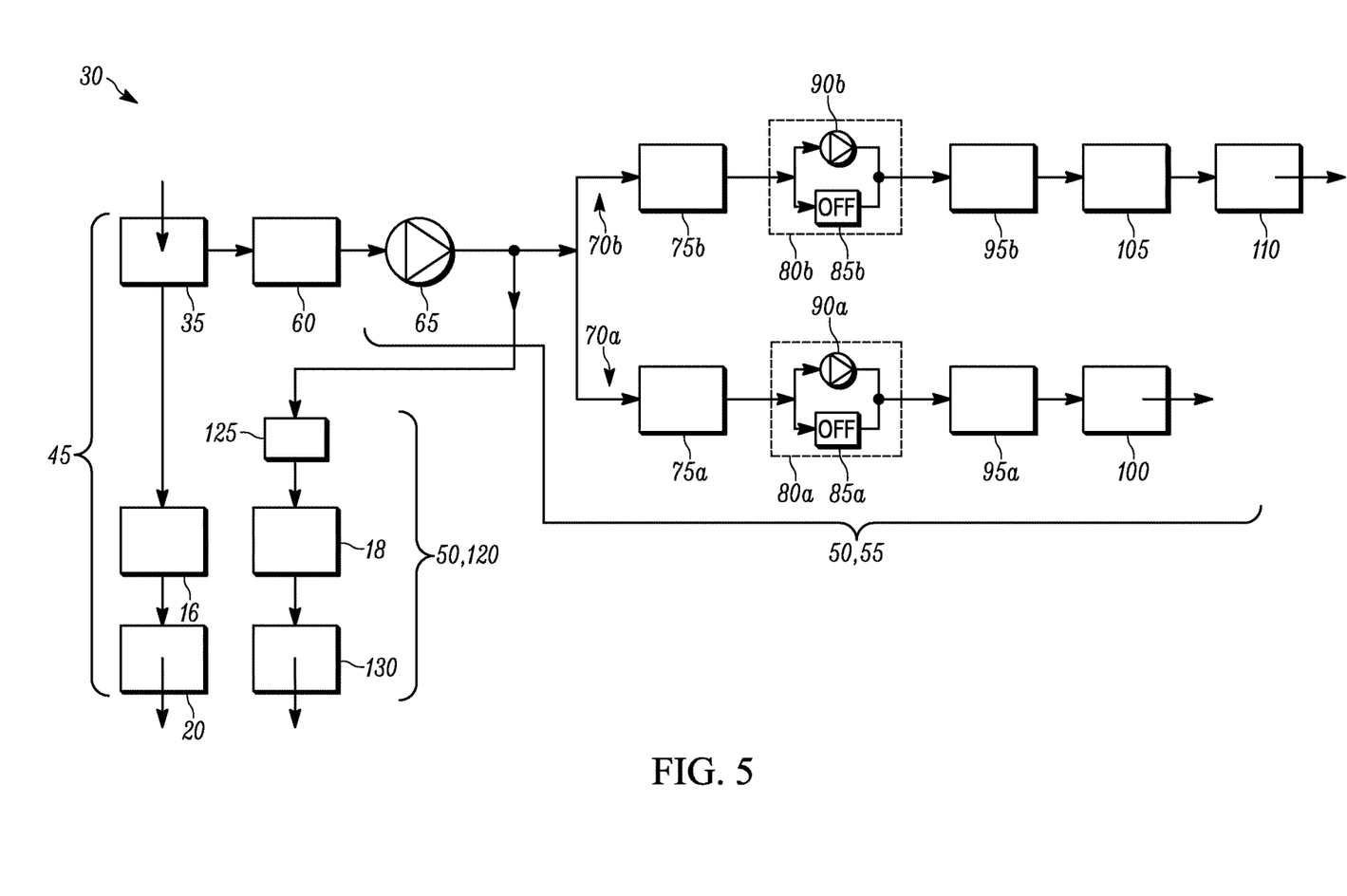
FIG. 5 is an example box diagram representation of the bi-directional flow ram air system of FIG. 1 in a third operating profile.

Each air flow system 80a, 80b can include a respective air mover 85a, 85b and a respective air mover bypass check valve 90a, 90b (see FIGS. 3-5). The air mover 85a, 85b can be a fan, an ejector, or any other suitable air moving apparatus. In the ram air system 30 depicted in FIGS. 2-5, the air mover 85a, 85b is arranged to pull air through the heat exchanging arrangement 75a, 75b (i.e, the air mover 85a, 85b is behind the heat exchanging arrangement 75a, 75b along the flow path of the cooling air). However, it is contemplated that the air mover 85a, 85b may be arranged to push air through the heat exchanging arrangement 75a, 75b (i.e., the air mover 85a, 85b can be provided in front of the heat exchanging arrangement 75a, 75b along the flow path of the cooling air). The air mover bypass check valve 90a, 90b can be moved between an open position and a closed position in response to operation of the air mover 85a, 85b. In one example, the air mover bypass check valve 90a, 90b is moved between the open and closed positions as a result of an inequality of air pressure due to operation of the air mover 85a, 85b. However, it is contemplated that the air mover bypass check valve 90a, 90b may be provided with an actuator that positively moves the valve between the open and closed positions.

As will be explained in further detail below, during operation of the aircraft 10, air is drawn through the heat exchanging arrangement 75a, 75b regardless of whether the air mover 85a, 85b is in operation. When the air mover 85a, 85b is not in operation, the air mover bypass check valve 90a, 90b is open and cooling air flows through the cooling branches 70a, 70b without passing through the air mover 85a, 85b (i.e., through the air mover bypass check valve 90a, 90b). When the air mover 85a, 85b is in operation, the air mover bypass check valve 90a, 90b is closed and cooling air flows through the cooling branches 70a, 70b, bypassing the air mover 85a, 85b (i.e., without passing through the air mover bypass check valve 90).

Each of the cooling branches 70a, 70b further includes a respective exhaust outlet 95a, 95b. In the ram air system depicted in FIGS. 2-5, one exhaust outlet 95a is provided in a direct exhaust opening 100 in the outer mold line 14 and one exhaust outlet 95b is provided in an aircraft exhaust bay 105. The aircraft exhaust bay 105 can house any aircraft component or plurality of components. Alternatively, it is contemplated that the aircraft exhaust bay 105 may be empty and operative mainly for the expulsion of gas exhausted from the cooling air pathway 55. The exhaust bay 105 includes a bay exhaust opening 110 in the outer mold line 14. The direct exhaust opening 100 and the bay exhaust opening 110 can each be provided with a grill 115 that is designed to minimize the impact the openings may have on aircraft design and performance (e.g., radar detection).

It is contemplated that other exhaust arrangements may be provided. For example, all of the exhaust outlets 95a, 95b can be provided in the exhaust bay 105. As another example, all of the exhaust outlets 95a, 95b can be provided in separate direct exhaust openings in the outer mold line 14. As yet another example, all of the exhaust outlets 95a, 95b can feed into a single manifold that in turn feeds into a single direct exhaust opening in the outer mold line 14. It is further contemplated that the exhaust of the cooling branches 70 may be a combination of any number of the aforementioned arrangements. Additionally, it is contemplated that the specific location of the exhaust openings on the outer mold line 14 may be chosen such that local pressure coefficients aid air flow through the cooling branches.

In addition to being in fluid communication with the engine air pathway 45, the cooling air pathway 55 may also be in fluid communication with a bi-directional air flow pathway 120 via a bay off-take 125. The bay off-take 125 effectively acts as a second intake for the cooling air pathway 55. In the ram air system depicted in FIGS. 2-5, the bi-directional flow air pathway 120 is defined at least in part by the engine bay 18. The engine bay 18 is provided with an engine bay air supply opening 130 in the outer mold line 14. As will be described in detail below, the engine bay air supply opening 130 is configured to allow air to flow out of the engine bay 18 or into the engine bay 18 depending on an operating profile of the ram air system 30. The engine bay air supply opening 130 can be provided with a grill 135 that is designed to minimize the impact the openings may have on aircraft design and performance (e.g., radar detection).

Operation of the ram air system 30 will now be described with reference to Table 1, provided below. Table 1 illustrates various operational aspects of the ram air system 30 as a function of aircraft airspeed. Aircraft components and air sources are arranged along the X-axis, while the different aircraft airspeed groups are arranged along the Y-axis.

The ram air system 30 has at least three different operating profiles that are dependent on aircraft airspeed. The first operating profile occurs when the aircraft is traveling slower than a transition airspeed. The second operating profile occurs when the aircraft is traveling at the transition airspeed. The third operating profile occurs when the aircraft is traveling faster than the transition airspeed.

The transition airspeed is defined as the speed at which the aircraft 10 must travel to force air into at least the engine inlet off-take 60 by ram air effect. The transition airspeed is not a fixed value. Rather, the transition airspeed is dependent on aircraft design, angle of attack, and/or other factors.

flow pathway 120 and into the cooling air pathway 55 via the bay off-take 125. Then, the cooling air is pulled through the first cooling branch 70a by the first air mover 85a past the first heat exchanging arrangement 75a. The cooling air passes through the first air flow system 80a via the first air movers 85a. In the first operating profile, substantially no air flows through the first air mover bypass check valves 90a. Then, the cooling air is exhausted from the aircraft through the exhaust outlet 95a. When the ram air system 30 is in the first operating profile, substantially no air enters into the cooling air pathway 55 from the engine inlet off-take 60.

Referring to the third row of Table 1, when the aircraft airspeed is at the transition airspeed and the ram air system 30 is in the second operating profile, the primary check valve 65 is opening/partially opened, the first air mover 85a is operating, the first air mover bypass check valve 90a is closed, and the air source of the first cooling branch 70a is provided by both the bay off-take 125 and the engine inlet off-take 60. The primary check valve 65 is opening/partially opened due to the fact that the pressure in front of and behind the respective valve (along the direction of air flow of the cooling air) is approximately equal.

Referring to FIG. 4, which represents the ram air system 30 in the second operating profile, cooling air for the cooling air pathway 55 continues to be drawn from the atmosphere into the aircraft via the bay off-take 125, as described above in reference to the first operating profile. In addition, cooling air is also being drawn into the cooling air pathway 55 via the engine inlet off-take 60. The cooling air flows into the

TABLE 1

| | | Aircraft Component /Air Source | | | | | | |
|---|---|---|---|---|---|---|---|---|
| | | Primary Check Valve | $1^{st}$ Branch Air Mover | $1^{st}$ Air Mover Bypass Check Valve | $1^{st}$ Cooling Branch Air Source | $2^{nd}$ Cooling Branch Air Mover | $2^{nd}$ Air Mover Bypass Check Valve | $2^{nd}$ Cooling Branch Air Source |
| Aircraft Airspeed | Zero | closed | on | closed | bay off-take | on | closed | bay off-take |
| | Flight - below transition speed | closed | on | closed | bay off-take | on | closed | bay off-take |
| | Flight - at transition speed | opening/ partially opened | on | closed | bay off-take and engine inlet off-take | on | closed | bay off-take and engine inlet off-take |
| | Flight - above transition speed | fully open | off | fully open | engine inlet off-take | off | fully open | engine inlet off-take |

Referring to the first and second rows of Table 1, when the aircraft airspeed is slower than the transition airspeed and the ram air system 30 is in the first operating profile, the primary check valve 65 is closed, the first air mover 85a is operating (Le, on), the first air mover bypass check valve 90a of the first cooling branch 70a is closed, and the first cooling branch 70a air source is provided from the bay off-take 125. The second cooling branch air mover 85b, the second branch air mover bypass check valve 90b, and the second branch air source all mimic the parameters of the first branch 70a and continue to do so throughout the two other operating profiles. As such, no further specific discussion of the parameters of the second branch 70b will be provided. However, it is contemplated that the operating parameters of the second branch 70b may be different than the operating parameters of the first branch 70a at the various operating profiles.

Referring to FIG. 3, which represents the ram air system 30 in the first operating profile, cooling air for the cooling air pathway 55 is drawn from the atmosphere into the aircraft 10 via the engine bay air supply opening 130. The cooling air flows through the engine bay 18 along the bi-directional air engine inlet off-take 60 and past the primary check valve 65, where the cooling air joins with cooling air sourced from the bay off-take 125 to produce combined cooling air. Then, the combined cooling air flows past the first heat exchanging arrangement 75a and through the first cooling branch 70a. The cooling air flows through the operating first air mover 85a as the cooling air flows through the first air flow system 80a. Finally, the cooling air is exhausted from the aircraft through the first exhaust outlet 95a.

Referring to the fourth row of Table 1, when the aircraft airspeed is faster than the transition speed and the ram air system 30 is in the third operating profile, the primary check valve is open 65, the first air mover 85a is not operating (i.e., off), the first air mover bypass check valve 90a is open, and the air source of the first cooling branch 70a is provided by the engine inlet off-take 60.

Referring to FIG. 5, which represent the ram air system 30 in the third operating profile, air for the cooling air pathway enters into the aircraft via the intake opening 35. The air flows into the intake opening 35 and into the engine inlet off-take due 60 to ram air effect. The air then flows past the primary check valve 65 and through the first cooling branch 70*a*. Ram air effect continues to move the air past the first heat exchanging arrangement 75*a*. Then, the cooling air passes through the first air flow system 80*a* via the first air mover bypass check valve 90*a*. In this operating profile, substantially no air flows through the first air mover 85*a*. Then, the cooling air is exhausted from the aircraft through the first exhaust outlet 95*a*. When the ram air system 30 is in the third operating profile, substantially no air enters into the cooling air pathway 55 from the bay off-take 125.

Additionally, it is noted that, when the ram air system 30 is in the third operating profile, air is flowing into the engine bay 18 also due to ram air effect. Once the air passes by the primary check valve 65, some of the air is diverted into the engine bay 18 via the bay off-take 125. Then, the air flows through the bi-directional air flow pathway 120 and is exhausted from the aircraft 10 via the engine bay air supply opening 130. This particular air flow arrangement can provide additional cooling capacity to the engine 16 at high operating speeds. Thus, the bi-directional air flow nature of the engine bay 18 becomes readily apparent. When the ram air system 30 is in the first or second operating profile, air is flowing from the atmosphere and into the engine bay 18. However, when the ram air system 30 is in the third operating profile, air is being exhausted from the engine bay 18 and into the atmosphere.

Figure 6:
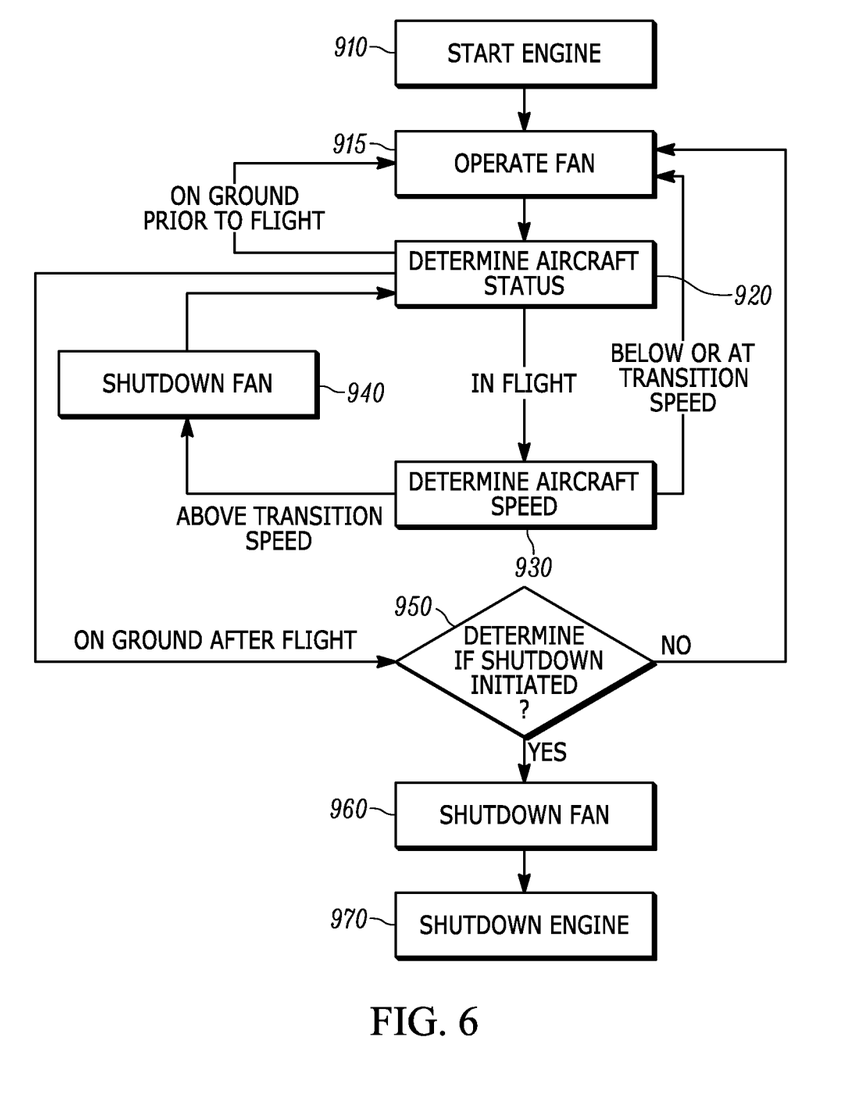
FIG. 6 is an example flow chart depicting an exemplary process of operating the bi-directional flow ram air system of FIG. 1.

Referring to FIG. 6, an example process of operating the ram air system of the present invention is illustrated. At 910, the aircraft 10 engine 16 is started. Then, the air movers 85*a*, 85*b* are operated at 915. Operating the air movers 85*a*. 85*b* draws in cooling air from the bay off-take 125 (see Table 1). Next, at 920, the operating status of the aircraft 10 is determined.

If it is determined at 920 that the aircraft 10 is on the ground prior to flight, the process returns to 915 and the air movers 85*a*, 85*b* continue to operate.

If it is determined that the aircraft 10 is on the ground after flight, the process moves to 950 and it is determined whether a shutdown sequence of the aircraft has been initiated. If a shutdown sequence of the aircraft 10 has not been initiated, the process returns to 915 and the air movers 85*a*, 85*b* continue to operate. If a shut down sequence of the aircraft has been initiated, the process moves to 960 where operation of the air movers 85*a*, 85*b* is terminated. The aircraft 10 engine 16 is subsequently shut down at 970. It is contemplated that the aforementioned order of the termination of the air movers 85*a*, 85*b* and the engine 16 may be altered as required based on the operation of the aircraft 10.

If it is determined that the aircraft 10 is in-flight, the process moves to 930 and the airspeed of the aircraft 10 is determined. If it determined that the aircraft 10 airspeed is less than or at the transition airspeed, the process returns to 915 and the air movers 85*a*, 85*b* continue to operate. If it is determined that the aircraft 10 air speed is greater than the transition speed, operation of the air movers 85*a*, 85*b* is terminated. Cooling air is then drawn in from the engine inlet off-take 60 (see Table 1). The process subsequently returns to 920.

What have been described above are examples of the disclosure. It is, of course, not possible to describe every conceivable combination of components or method for purposes of describing the disclosure, but one of ordinary skill in the art will recognize that many further combinations and permutations of the disclosure are possible. For example, although the primary check valve 65 has been described as opening/closing in response to a difference in pressure in front of and behind the valve, it is contemplated that an actuator may be provided to positively move the primary check valve between an opened position and a closed position. As another example, the check valve 90 may be omitted in either one of, or both, of the cooling branches 70. Accordingly, the disclosure is intended to embrace all such alterations, modifications, and variations that fall within the scope of this application, including the appended claims.

We claim:

1. A ram air system for an aircraft having an engine and a fuselage with an outer mold line, the ram air system comprising:
    an engine air pathway including an opening in the outer mold line defining an engine inlet, the engine air pathway being configured to supply combustion air for combustion in the engine; and
    an auxiliary air pathway including a first intake disposed inside the outer mold line in the engine inlet and a second intake disposed externally to the engine air pathway, the second intake being in fluid communication with a bay that houses at least one of the engine and at least a portion of the aircraft electronics, the auxiliary air pathway being configured to draw in cooling air to cool ancillary aircraft components from at least one of the first intake and the second intake based on the airspeed of the aircraft.

2. The ram air system of claim 1, wherein the auxiliary air pathway draws in cooling air from the first intake when the aircraft is traveling at a first airspeed, draws in cooling air from the second intake when the aircraft is traveling at a second airspeed that is less than the first airspeed, and draws in cooling air from both the first intake and the second intake when the aircraft is traveling at a third airspeed, the third airspeed being greater than the second airspeed and less than the first airspeed.

3. The ram air system of claim 2, wherein the auxiliary air pathway includes a first check valve provided at the first intake, the first check valve being in an open condition to permit air flow into the first intake when the aircraft is traveling at the first airspeed and the first check valve being in a closed condition to prevent air flow into the first intake when the aircraft is traveling at the second airspeed.

4. The ram air system of claim 3, wherein the auxiliary air pathway includes a second check valve and an air mover, the air mover being configured to move cooling air through the auxiliary air pathway to cool the ancillary aircraft components, the second check valve being in an open condition when the air mover is not in operation and the second check valve being in a closed condition when the air mover is in operation.

5. The ram air system of claim 4, wherein the air mover is one of a fan and an ejector.

6. The ram air system of claim 1, wherein the ancillary aircraft components include at least one of an environmental control system heat exchanger, a fuel heat exchanger, and bay ventilation.

7. The ram air system of claim 1, wherein the bay includes an opening that exhausts outside the outer mold line, and wherein the opening provides the cooling air drawn in from the second intake.

8. The ram air system of claim 7, wherein the opening includes a grill that is configured to minimize at least one of aircraft drag, aircraft vulnerability, radar detection, and aircraft maintenance.

9. The ram air system of claim 1, wherein the auxiliary air pathway includes a plurality of branches, each of the plurality of branches providing cooling air to at least one of the ancillary aircraft components, each of the plurality of branches drawing in cooling air from at least one of the first intake and the second intake based on the airspeed of the aircraft.

10. The ram air system of claim 9, wherein all of the plurality of branches exhaust the cooling air outside the outer mold line via separate, individual exhaust openings in the outer mold line.

11. The ram air system of claim 9, wherein all of the plurality of branches exhaust the cooling air outside the outer mold line via a single, shared exhaust opening in the outer mold line.

12. The ram air system of claim 9, wherein all of the plurality of branches exhaust the cooling air into an aircraft bay that includes an opening in the outer mold line for discharging exhausted cooling air.

13. A method of operating a ram air system for an aircraft having an engine and an outer mold line, the method comprising:
providing an engine air pathway having an engine inlet that supplies operating air for combustion in the engine and an auxiliary air pathway that supplies cooling air for cooling ancillary aircraft components, the auxiliary air pathway including a first intake disposed inside the outer mold line in the engine inlet and a second intake disposed externally to the engine air pathway;
determining the speed of the aircraft; and
selecting at least one of the first intake and the second intake for drawing in the cooling air into the auxiliary air pathway based on the determined aircraft speed, including selecting the first intake based on a determination that the aircraft is traveling at least at a first airspeed that is sufficient to flow cooling air through the auxiliary air pathway by ram air effect.

14. The method of claim 13, wherein selecting at least one of the first intake and the second intake includes selecting the second intake based on a determination that the aircraft is traveling at a second airspeed that is less than the first airspeed.

15. The method of claim 14, wherein selecting at least one of the first intake and the second intake includes selecting both the first intake and the second intake based on a determination that the aircraft is traveling at a third airspeed that is greater than the second airspeed but less than the first airspeed.

16. The method of claim 15 including operating an air mover to move cooling air through the auxiliary air pathway to cool the ancillary aircraft components based on a determination that the aircraft is moving at the second airspeed or the third airspeed.

17. The method of claim 13, wherein selecting at least one of the first intake and the second intake includes selecting with a check valve provided at the first intake.

18. A ram air system for an aircraft having an engine and a fuselage with an outer mold line, the ram air system comprising:
an engine air pathway including an opening in the outer mold line defining an engine inlet, the engine air pathway being configured to provide operating air for combustion in the engine; and
an auxiliary air pathway being configured to draw in cooling air to cool ancillary aircraft components from a first source and a second source based on the airspeed of the aircraft, the auxiliary air pathway comprising:
a first intake as the first source, the first intake opening being disposed inside the outer mold line in the engine inlet;
a first check valve provided at the first intake opening;
a second intake as the second source, the second intake opening being disposed externally to the engine air pathway, and
a plurality of branches, each of the plurality of branches providing cooling air to at least one of the ancillary aircraft components, each of the plurality of branches including a check valve and an air mover, the air mover being configured to move air through the respective branch to cool the at least one ancillary aircraft component, the check valve being in an open condition when the air mover is not in operation and a closed condition when the air mover is in operation.

* * * * *